(12) United States Patent
Dantwala

(10) Patent No.: US 7,119,854 B2
(45) Date of Patent: Oct. 10, 2006

(54) METHOD FOR DERIVING AN OBJECTIVE SHARPNESS METRIC

(75) Inventor: Nehal Dantwala, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 725 days.

(21) Appl. No.: 10/034,665

(22) Filed: Dec. 28, 2001

(65) Prior Publication Data

US 2003/0133624 A1    Jul. 17, 2003

(51) Int. Cl.
*H04N 5/21* (2006.01)

(52) U.S. Cl. ............... 348/625; 348/628; 348/629; 348/192; 382/263; 382/266

(58) Field of Classification Search .......... 348/625, 348/627, 628, 629, 135, 180, 192; 382/190–193, 382/199, 263, 266; H04N 5/21
See application file for complete search history.

(56) References Cited

U.S. PATENT DOCUMENTS 5,272,533 A * 12/1993 Akiyama et al. ........ 348/607
5,850,294 A * 12/1998 Apostolopoulos et al. ........ 358/426.14
6,097,847 A *  8/2000 Inoue ........................ 382/266

FOREIGN PATENT DOCUMENTS

EP    1365355 A2 * 11/2003
JP    50-040756    *  6/1982

OTHER PUBLICATIONS

Jaspers and de With, "A Generic 2D Sharpness Enhancement Algorithm For Luminance Signals", IPA97, pp. 269-273, Conference Publication No. 443, Jul. 1997.
Hentschel et al., "Noise Measurement In Video Images", International Conference On Consumer Electronics (ICCE) 2000, Digest Of Technical Papers, pp. 56-57.

* cited by examiner

*Primary Examiner*—Trang Tran

(57) ABSTRACT

A method is provided for deriving an objective sharpness metric for objectively determining the level of image sharpness of many and unspecific images having different degrees of sharpness. The method for deriving the objective sharpness metric utilizes sub-band frequency information and false edge information for both an original video sequence and a sharpened sequence to be scored.

15 Claims, 2 Drawing Sheets

---

RECEIVE AS AN INPUT AN
ORIGINAL VIDEO SEQUENCE    200

PROCESS THE ORIGINAL VIDEO
SEQUENCE TO DERIVE A SHARPNESS    202
VIDEO SEQUENCE

CALCULATE SPECTRAL ENERGY
INFORMATION IN THE SHARPENED    204
VIDEO SEQUENCE FOR WHICH A
SHARPNESS QUALITY SCORE IS
DESIRED

CALCULATE SPECTRAL ENERGY
INFORMATION IN THE ORIGINAL    206
VIDEO SEQUENCE

CALCULATE FALSE EDGE
INFORMATION DATA IN THE    208
SHARPENED VIDEO SEQUENCE

DERIVE THE OBJECTIVE SHARPNESS
METRIC FROM THE SPECTRAL ENERGY    210
INFORMATION AND THE FALSE
EDGE INFORMATION

RECEIVE AS AN INPUT AN
ORIGINAL VIDEO SEQUENCE       200

PROCESS THE ORIGINAL VIDEO
SEQUENCE TO DERIVE A SHARPNESS   202
VIDEO SEQUENCE

CALCULATE SPECTRAL ENERGY
INFORMATION IN THE SHARPENED   204
VIDEO SEQUENCE FOR WHICH A
SHARPNESS QUALITY SCORE IS
DESIRED

CALCULATE SPECTRAL ENERGY
INFORMATION IN THE ORIGINAL   206
VIDEO SEQUENCE

CALCULATE FALSE EDGE
INFORMATION DATA IN THE        208
SHARPENED VIDEO SEQUENCE

DERIVE THE OBJECTIVE SHARPNESS
METRIC FROM THE SPECTRAL ENERGY  210
INFORMATION AND THE FALSE
EDGE INFORMATION

FIG. 2

METHOD FOR DERIVING AN OBJECTIVE SHARPNESS METRIC

BACKGROUND OF THE INVENTION

1. Field of the Invention

The present invention is directed, in general, to video optimization, and more particularly to a method for deriving an objective metric for evaluating sharpness of video sequences.

2. Description of the Related Art

Sharpening is performed in order to improve the picture quality of an image. As such, sharpness is an image attribute that is clearly identified by the human visual system (HVS). The HVS can easily grade an image as being 'unsharp', 'normally sharp', 'very sharp' or 'unnaturally sharp'. Up to a certain level of sharpness, the HVS perceives the picture as more pleasing. However, beyond a certain sharpness level, the picture starts to look unnatural. If the sharpness is increased even further, the picture starts to exhibit artifacts like saturation, aliasing, false edges, etc. At this point, the image becomes subjectively intolerable. Clearly, there exists a relationship between the sharpness level of an image and the HVS.

It would therefore be desirable to objectively characterize the relationship between the sharpness level of an image and the HVS so as to develop an objective quality metric. The metric could find application, for example, in an automated video optimization chain.

SUMMARY OF THE INVENTION

It is an therefore an object of the present invention to provide an objective sharpness metric by which sharpness values of many and unspecific images having different degrees of sharpness can be measured.

It is another object of the present invention to incorporate the objective sharpness metric into an automated video optimization chain.

In order to attain the objects described above, there is provided a method for deriving an objective sharpness metric for objectively determining the level of image sharpness of many and unspecific images having different degrees of sharpness. In one embodiment, the method for deriving the objective sharpness metric utilizes sub-band frequency information and false edge information for both an original video sequence and a sharpened sequence to be scored.

BRIEF DESCRIPTION OF THE DRAWINGS

The present invention may be more fully understood from the detailed description given below and from the accompanying drawings of the preferred embodiments of the invention, which, however, should not be taken to limit the invention to the specific embodiments but are for explanation and understanding only.

FIG. 2 is a flow chart illustrating a method in accordance with the present invention.

DETAILED DESCRIPTION OF THE PREFERRED EMBODIMENTS

Figure 1:
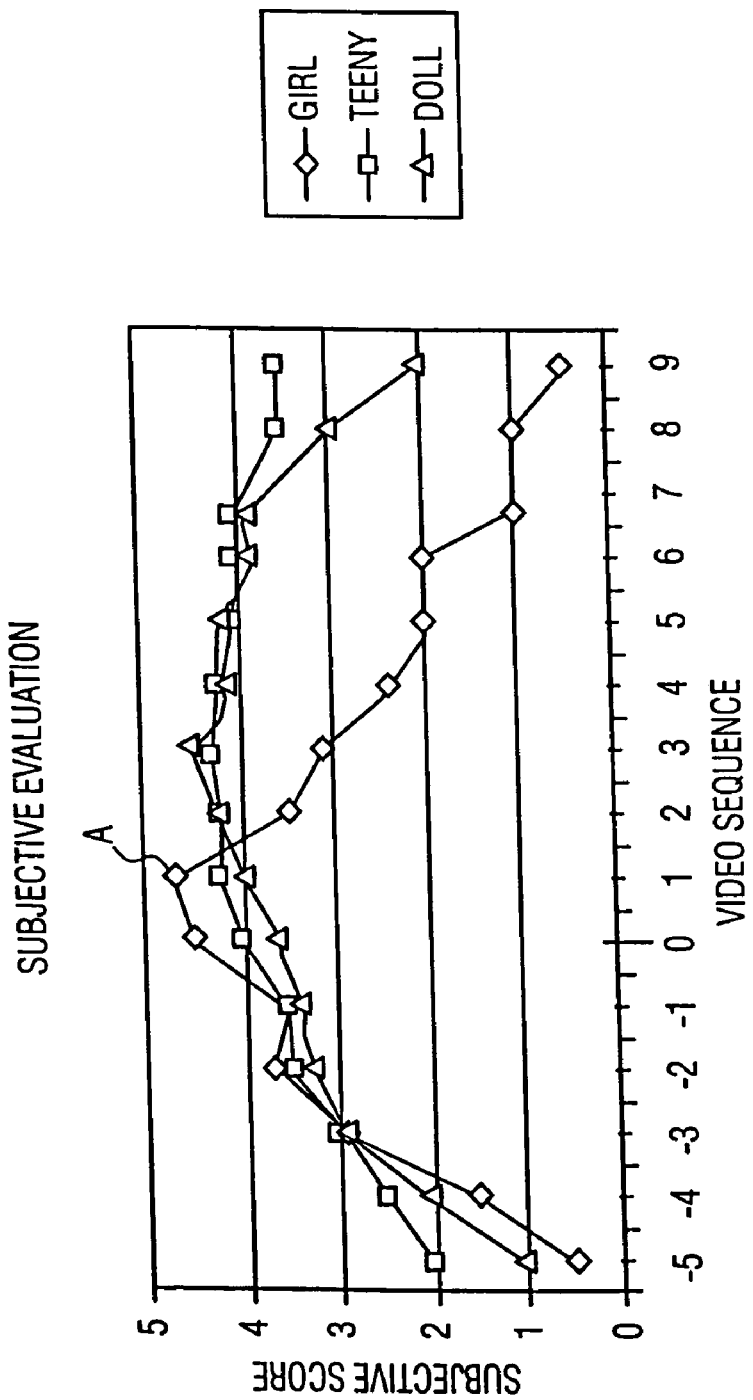
FIG. 1 is a graph illustrating experimental results of a subjective evaluation of sharpness for three exemplary video sequences according to the prior art.

The present invention discloses a method for deriving an objective sharpness metric. The motivation for the present invention derives from a Video Chain Optimization (VCO) project in which a number of objective quality metrics, unrelated to sharpness, were developed for inclusion in an automated video chain optimization. The objective metrics measure features/artifacts of a video sequence and use the results to drive the video chain for optimum parameters. It was recognized that the video chain included a sharpness enhancement function but there was no way of tuning this function to its optimum level. As a result, a need was recognized for creating an objective sharpness metric for use in the video chain to tune the sharpness function at an optimum level.

Defining an objective sharpness metric is not a straightforward task. To do so in an accurate manner requires a modeling of the complex characteristics of the human visual system (HVS) with respect to image attributes. To circumvent the complexity and necessity of performing an exact modeling, the present invention instead identifies a few fundamental factors that contribute to perceived image sharpness. Once identified, the fundamental factors can be combined to form a single composite objective sharpness metric. It will be shown that combining the fundamental factors into a single objective composite metric provides a good amount of correlation with subjective sharpness measurements.

FIG. 1 is a graph illustrating the results of a subjective evaluation of image quality for three exemplary video sequences, i.e., a girl sequence, a teeny sequence and a doll sequence. The subjective evaluation involved constructing fourteen supplemental video sequences for each original sequence of which were altered in some manner. In particular, for each original sequence, labeled as sequence 0 in FIG. 1, five additional sequences were generated, labeled sequences −1 through −5, representing sequences for which varying degrees of blurring was applied via a low-pass filter. In addition, nine additional sequences were generated, labeled sequences 1–9, representing sequences for which varying degrees of sharpness was applied.

The sharpened sequences, i.e., 1–9, were generated from the original sequence using a CPA peaking algorithm. CPA peaking algorithms are well known in the art and are described in "A Generic 2D Sharpness Enhancement Algorithm for Luminance Signals," Jaspers et al., IPA97, pages 269–273, Conference Publication No. 443, July 1997. Also, it will be appreciated by those skilled in the art that any suitable algorithm could be used to generate the sharpened sequences.

The three exemplary video sequences were subjectively scored on a traditional 0–5 quality scale, i.e., the y-axis, with 0 representing the worst image quality and 5 representing the best or highest image quality. As shown in FIG. 1, each of the plots exhibits a peak corresponding to a most desirable or 'best' video sequence. For example, in the plot of the 'girl' video sequence, the peak (point A) corresponds to a slightly sharpened video sequence.

The plots of FIG. 1 further highlight that for each of the three video sequences, the subjective quality score falls off dramatically after the occurrence of the peak or 'best' video sequence due to "over-sharpening". This falloff in perceived video quality indicates that the subjective response generally perceives the slightly sharpened image as most pleasing to the human eye, while further sharpening is perceived as less desirable.

It is an objective of the present invention to provide an objective sharpness metric that can objectively score many and unspecific images having different degrees of sharpness, whereby the objective score correlates to a subjectively determined score for substantiation.

In one embodiment, frequency information of an original and sharpened sequence is used to construct one component of an objective sharpness metric, in accordance with the method of the present invention. The details of which are described as follows.

The present invention recognizes an existing correlation between the frequency content of a video sequence and the level of applied sharpness applied. In particular, increasing the sharpness of a video sequence generally translates visually into enhanced transitions or edges. In the frequency domain, the increased sharpness applied corresponds to an increase in the mid-to-high frequency components of a sharpened sequence's frequency spectrum. This correlation is illustrated in Table 1, for the 'teeny' video sequence discussed above with reference to FIG. 1.

Table 1 illustrates, for the 'teeny' video sequence, the frequency content of the sequence in the horizontal direction for the original and sharpened sequences. The frequency content was calculated as a horizontal FFT. The horizontal FFT was chosen to minimize processing demands and recognizing that differences in the amount of sharpness applied to a video sequence are most pronounced in the horizontal direction. A vertical FFT, however, could be calculated in an alternate embodiment.

TABLE 1

'Teeny' video sequence

| Sharpness Level | Degree of Sharpness applied | Normalized energy in upper half of frequency spectrum calculated in the horizontal direction |
|---|---|---|
| 0 | 0 | 0.05601 |
| 1 | 0.1 | 0.05638 |
| 2 | 0.2 | 0.057151 |
| 3 | 0.3 | 0.05807 |
| 4 | 0.4 | 0.059253 |
| 5 | 0.5 | 0.060707 |
| 6 | 0.6 | 0.062121 |
| 7 | 0.7 | 0.063949 |
| 8 | 0.8 | 0.065765 |
| 9 | 0.9 | 0.067364 |

Referring to Table 1, the table values of the third column are calculated as the energy in the upper half of the frequency spectrum of the 'teeny' video sequence divided or normalized by the total energy of the video sequence. As such, the FFT values represent energy ratios in the frequency domain.

The 'upper half' of the frequency spectrum is defined herein as energy in the upper one-half of the frequency spectrum. One-half represents a lower bound for determining the 'upper half'. Alternate embodiments can use any value equal to or greater than one-half to define the 'upper half'.

An important observation to be made from Table 1 is that there is an observed increase in the energy of the mid-to-upper frequency components, i.e., the 'upper half' of the 'teeny' video sequence with increasing levels of sharpness applied. That is, Table 1 illustrates by example, how an increase in the 'upper half' frequency energy increases when a video sequence is increasingly sharpened using a sharpness enhancement algorithm.

A second observation, not evident from Table 1, concern the occurrence of artifacts which are introduced into a video sequence when there is an observed increase in the energy in the lower frequency bands. This observation is verified through experiment and is discussed as follows.

The experiment involved calculating horizontal FFT values for a baseline video sequence and nine sharpened sequences. The frequency spectrum of the baseline sequence was divided into five equal sub-bands, (i.e., I=1–5). For each of the respective sub-bands, a normalized FFT value was computed as a percentage difference between the baseline FFT value, i.e., the energy in band I of the original video sequence, and the energy in band I of the signal. This calculation is performed in the horizontal direction and is described by equation 1 as follows:

$$FFT_{NORM}(I) = 100 \times \frac{\text{baseline } FFT_{hor}(I) - \text{sharpened } FFT_{hor}(I, J)}{\text{baseline } FFT_{hor}(I)} \quad \text{Eq. 1}$$

where

I=video sequence sub-band=1, 2, . . . 5 baseline $FFT_{hor}(I)$=the energy in the horizontal direction in the Ith frequency band of the baseline video sequence 0;

sharpened FFT(I,J)=the energy in the horizontal direction in the Ith frequency band of the Jth sharpened video sequence, where J=1, 2, 3, . . . 9.

Table 2 illustrates at column 3, the subjective scores for the baseline and sharpened sequences. Columns 4–8 illustrate the computed normalized FFT values, $FFT_{NORM}$ (I), computed for each of the respective sub-bands, i.e. 1–5, for the illustrative 'teeny' video sequence. The normalized FFT values, $FFT_{NORM}$ (I) are calculated in accordance with equation 1 above.

TABLE 2

'Teeny video sequence'

| Sharpness Level | Degree of Sharpness applied | Subjective score | Sub-band 1 | Sub-band 2 | Sub-band 3 | Sub-band 4 | Sub-band 5 |
|---|---|---|---|---|---|---|---|
| 0 | 0 | 4.5 | 0 | 0 | 0 | 0 | 0 |
| 1 | 0.1 | 4.7 | 0 | −1 | −1 | −2 | −2 |
| 2 | 0.2 | 3.5 | −1 | −2 | −3 | −4 | −7 |
| 3 | 0.3 | 3.1 | −1 | −3 | −5 | −8 | −13 |
| 4 | 0.4 | 2.5 | −2 | −5 | −7 | −11 | −20 |
| 5 | 0.5 | 2.0 | −2 | −6 | −8 | −14 | −28 |
| 6 | 0.6 | 2.0 | −3 | −6 | −9 | −17 | −36 |
| 7 | 0.7 | 1.0 | −3 | −7 | −11 | −20 | −43 |

TABLE 2-continued

'Teeny video sequence'

| Sharpness Level | Degree of Sharpness applied | Subjective score | Sub-band 1 | Sub-band 2 | Sub-band 3 | Sub-band 4 | Sub-band 5 |
|---|---|---|---|---|---|---|---|
| 8 | 0.8 | 1.0 | −4 | −8 | −12 | −24 | −50 |
| 9 | 0.9 | 0.5 | −4 | −9 | −14 | −27 | −58 |

Note:
when an FFT value in a particular band of a sharpened image increases above the baseline, then the table value becomes negative.

Examining Table 2, it is noted that the computed FFT values in the fourth and fifth bands, i.e., the 'upper half' bands, exhibit the most immediate energy transition of significance from the $0^{th}$ sharpness level to the $1^{st}$ sharpness level. Specifically, the sub-band energy values transition from (0,0) to (−2,−2). It is further observed that the FFT values in the 'lower frequency bands', i.e., 1–3, do not undergo an immediate transition in energy. That is, there is some lag effect. It is observed that the first significant energy change for the 'lower frequency bands' occurs, not from the $0^{th}$ to the $1^{st}$ sharpness level, but instead from the $2^{nd}$ to the $3^{rd}$ sharpness level. For the illustrative sequence, the energy transitions for sub-bands 1–3 from the $2^{nd}$ to the $3^{rd}$ sharpness level transition from (0,−1,−1) to (−1,−2,−3).

It is noted that while the frequency spectrum was divided into five bands in the illustrative example, it is contemplated that the spectrum could be divided into more or fewer bands with different criteria applied to fine-tune the desired energy transitions indications. It is further contemplated to use perceptual models to monitor frequency changes.

Noting the difference in the energy transition intervals for the lower and upper frequency sub-bands provide one measure for deriving an objective sharpness metric that correlates with the subjective scores. In addition to utilizing the energy transitions in the frequency domain, the method of the present invention also utilizes false-edge information to derive the objective sharpness metric.

False edges represent one artifact which are introduced by sharpness enhancement functions. The number of false edges introduced from a sharpness enhancement function can be measured and used to construct a more precise objective sharpness metric. A false edge is created in an image when a sharpness enhancement function boosts weak (low amplitude) edges that didn't stand out prior to the sharpening operation. These boosted weak edges, which appear like ringing around the actual edges, may become noticeable and cause annoyance to an observer.

Table 3 lists the false edges levels for the 'teeny' sequence. It is shown that false edges start to occur at the $3^{rd}$ sharpness level.

TABLE 3

| Sharpness level | Degree of Sharpness applied | False edge for 'teeny' sequence |
|---|---|---|
| 0 | 0 | 0 |
| 1 | 0.1 | 0 |
| 2 | 0.2 | 0 |
| 3 | 0.3 | 9 |
| 4 | 0.4 | 13 |
| 5 | 0.5 | 18 |
| 6 | 0.6 | 24 |
| 7 | 0.7 | 43 |

TABLE 3-continued

| Sharpness level | Degree of Sharpness applied | False edge for 'teeny' sequence |
|---|---|---|
| 8 | 0.8 | 67 |
| 9 | 0.9 | 83 |

False edge information is used as one component in the derivation of the objective sharpness metric. In one embodiment, the false edge information is obtained by comparing edges in the original and sharpened sequence through the creation of edge maps, to be discussed below. A false edge is defined as a additional edge created in the sharpened picture that is strong and not adjacent to an original edge. A false edge must also contain at least two pixels to distinguish it from a single spurious noise pixel.

In one embodiment, false edge information is obtained via the creation of edge maps in both the original and sharpened video sequences. The two edge maps are compared to determine a number of additional edges in the sharpened video sequence. Each additional edge map pixel discovered in the sharpened sequence is added to a running pixel count. The final pixel count is then compared against a pixel threshold. If the pixel count exceeds the pixel threshold, the objective sharpness quality score for the sharpened sequence is diminished to reflect the generation of false edges in the sharpened sequence. Otherwise, if the pixel count does not exceed the pixel threshold, the objective sharpness quality score does not reflect the generation of false edges.

Program code for illustrating an exemplary sharpness metric is shown to illustrate one way in which frequency information and false edge information may be combined to obtain an objective sharpness quality score. The metric is illustrative only. It is recognized that the frequency and false edge information can be combined in any number of different ways to arrive at other embodiments of an objective sharpness metric.

if (# of additional false_edges>TH1)
        score=$FFT_{orig}$−(# of false_edges)×$FFT_{diff}$
    else
    if (FFT1+FFT2>TH2)
        score=$FFT_{orig}$−(FFT1+FFT2)×$FFT_{diff}$
    else
        score=$FFT_{seq}$
    where:
    $FFT_{orig}$=the normalized FFT level of the original sequence
    $FFT_{seq}$=the FFT of the processed sequence that we are scoring
    $FFT_{diff}$=normalized FFT of sharpened sequence−normalized FFT of original sequence.

false_edges=number of false edges in the sharpened sequence

FFT1, FFT2=% change in lower bands between processed and original

TH1, TH2=thresholds which can be varied according to personal preference

Irrespective of how the frequency and false edge data is combined to derive a sharpness metric, it is assumed that a user provides as input a baseline or original video sequence and at least one additional sharpened sequence derived from the original sequence. The primary objective is to 'score' the sharpened sequence. That is, provide some objective criteria for determining the quality of the sharpened sequence relative to the baseline or original sequence.

The program code representing one illustrative objective sharpness metric is now described. It is first noted that the thresholds, TH1 and TH2, are empirically derived and can vary according to the subjective preferences of the user.

Referring to the above code, it is first determined whether the number of additional false edges in the sharpened sequence, determined via the creation of edge maps, as described above, exceeds a false edge threshold, TH1.

if (# of additional false_edges>TH1)
    score=$FFT_{orig}$−(# of additional false_edges)×$FFT_{diff}$ If so, the quality score is calculated as shown as the normalized FFT energy level of the original sequence, $FFT_{orig}$, minus the product of the number of additional false edges found in the sharpened sequence and the term $FFT_{diff}$, which represents the difference between the normalized FFT of the sharpened sequence and the normalized FFT of the original sequence. The process terminates at this point.

Otherwise, the process continues to the next determination step where it is determined whether the sum of the percentage energy change in the first and second sub-bands, (FFT1+FFT2), exceeds the energy threshold, TH2, as shown below:

if ((FFT1+FFT2)>TH2)
    score=$FFT_{orig}$−(FFT1+FFT2)×$FFT_{diff}$

If the second threshold, TH2, is exceeded at the second determination step, the quality score is calculated as the normalized FFT level of the original sequence, $FFT_{orig}$, minus the product of the sum of the percentage energy change in the first and second sub-bands, FFT1 and FFT2, and $FFT_{diff}$, the difference between the normalized FFT of the sharpened sequence and the normalized FFT of the original sequence. The process terminates at this point.

Otherwise, in the event the second threshold is not exceeded, the quality score is simply determined to be the FFT energy level of the sharpened sequence, $FFT_{seq}$.

Noise represents an additional consideration in the above calculations. The presence of noise in a video sequence will tend to produce higher or skewed FFT values than what would otherwise be calculated for a clean or noise free sequence. Compensation techniques for noisy sequences may be employed to account for the presence of noise to improve the reliability of the sharpness metric. In particular, one method for compensating for the presence of noise in the original sequence is as follows:

$$FFT\text{new}=1.2+FFT\text{orig}/^{10}\log(\text{noise\_level}) \quad (2)$$

In equation 2, the constant 1.2 is an empirically defined offset to adjust the scale of the resulting FFT values.

The noise_level for the original sequence described in equation (2) is based on a technique described in Hentschel et al., International Conference on Consumer Electronics (ICCE) 2000, Digest of Technical Papers, pages 56–57, 2000.

Next, compensation for the sharpened sequence may be made in any number of ways. In one embodiment, noise compensation is made in accordance with the following equation:

$$FFT_{seq\_mod}=FFT_{new}+FFT_{diff} \quad (3)$$

With the noise compensated FFT levels, the sharpness metric discussed above is now determined as:

if (false_edges>TH1)
    score=$FFT_{new}$−(false_edges)×$FFT_{diff}$
else
if (FFT1+FFT2>TH2)
    score=$FFT_{new}$−(FFT2)×$FFT_{diff}$
else
    score=$FFT_{seq\_mod}$, The sharpness metric defined above is a candidate for inclusion within the previously mentioned video optimization chain for tuning the sharpness enhancement function to an optimum level.

With reference to FIG. 2 there is shown a flow chart illustrating the method for deriving an objective sharpness metric for determining the sharpness quality level of video sequences having different degrees of sharpness in accordance with the present invention. At step 200, an original video sequence is received as an input by at least one processor. At step 202, the at least one processor processes the original video sequence to derive a sharpened video sequence. Next, at step 204, the method calculates spectral energy information in the sharpened video sequence for which a sharpness quality score is desired. At step 206, spectral energy information in the original video sequence is calculated. At step 208, false-edge information in the sharpened video sequence is calculated. Finally, at step 210, the objective sharpness metric from the spectral energy information and the false edge information is derived, where the objective sharpness metric provides an objective sharpness quality score representative of the quality of the sharpened video sequence.

It is appreciated by one skilled in the art that the inventive methods described herein are implemented by a system which includes a computer-readable medium on which is stored a set of programmable instructions (i.e., software) embodying any one, or all, of the methodologies described above. The set of programmable instructions are capable of being executed by at least one processor. For the purposes of this specification, the term "computer-readable medium" shall be take to include any medium that is capable of storing or encoding a sequence of instructions for execution by the at least one processor and that cause the at least one processor to perform any one of the methodologies of the present invention. The term "computer-readable medium" shall accordingly be taken to include, but not limited to, solid-state memories, optical and magnetic disks, and carrier wave signals.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. A method for optimizing the sharpening of a video sequence using an objective sharpness quality score derived from an objective sharpness metric for determining the sharpness quality level of video sequences having different degrees of sharpness, said method comprising the steps of;
   receiving as an input an original video sequence;
   processing the original video sequence to derive a sharpened video sequence;
   calculating a first spectral energy information in said sharpened video sequence;
   calculating a second spectral energy information in said original video sequence;
   calculating false edge information data in said sharpened video sequence;
   deriving said objective sharpness metric from said first and second spectral energy information and said false edge information, said objective sharpness metric providing said objective sharpness quality score representative of the quality of said sharpened video sequence; and
   re-processing the original video sequence using said objective sharpness quality score to derive an optimized sharpened video sequence.

2. The method as claimed in claim 1, wherein the step of calculating false edge information data in said sharpened video sequence further comprises calculating a total number of false edges in said sharpened video sequence.

3. The method as claimed in claim 2, wherein said step of deriving said optimized sharpness metric comprises the sub-steps of:
   determining whether said total number of false edges exceeds a first threshold; and
   computing said sharpness quality score from said first and second spectral energy information and said total number of false edges.

4. The method as claimed in claim 2, wherein the step of calculating said total number of false edges in said sharpened video sequence, further comprises the sub-steps of:
   creating a first edge map in said original video sequence;
   creating a second edge map in said sharpened video sequence; and
   comparing said first and second edge maps to determine said total number of false edges in said sharpened video sequence.

5. The method as claimed in claim 1, wherein the step of calculating said second spectral energy information in said original sequence further comprises the sub-steps of:
   determining the frequency spectrum of said original video sequence; and
   computing a normalized Fourier transform of said original video sequence from said frequency spectrum.

6. The method as claimed in claim 1, wherein the step of calculating said first spectral energy information in said sharpened sequence further comprises the sub-steps of:
   determining the frequency spectrum of said sharpened video sequence;
   dividing the frequency spectrum into at least a first and a second sub-band;
   computing a first normalized Fourier transform of said sharpened video sequence in said at least first sub-band;
   computing a second normalized Fourier transform of said sharpened video sequence in said at least second sub-band; and
   using said first and second normalized Fourier transforms to derive said objective sharpness metric.

7. The method as claimed in claim 6, wherein the first and second normalized Fourier transforms are one of a horizontal and vertical transform.

8. A system for optimizing the sharpness quality level of a received video sequence, comprising:
   means for receiving an original video sequence;
   means for applying a sharpness enhancement function to said original video sequence to generate a sharpened video sequence;
   a processor for deriving an objective sharpness metric, said processor comprising:
      means for calculating a first spectral energy information indicative of the sharpened video sequence;
      means for calculating a second spectral energy information in said original video sequence;
      means for calculating false edge information data in said sharpened video sequence; and
      means for deriving said objective sharpness metric from said first and said second spectral energy information and said false edge information, said objective sharpness metric providing an objective sharpness quality score representative of the quality of said sharpened video sequence; and
   means for optimizing the sharpness quality level of said received video sequence using said objective sharpness metric.

9. A computer-readable medium comprising instructions which when executed on a processor, cause the processor to perform a method for deriving an objective sharpness metric for determining the sharpness quality level of video sequences having different degrees of sharpness, the method comprising the steps of:
   receiving as an input an original video sequence;
   processing the original video sequence to derive a sharpness video sequence;
   calculating a first spectral energy information in said sharpened video sequence for which a sharpness quality score is desired;
   calculating spectral energy information in said original video sequence;
   calculating false edge information data in said sharpened video sequence; and
   deriving said objective sharpness metric from said first and second spectral energy information and said false edge information, said objective sharpness metric providing an objective sharpness quality score representative of the quality of said sharpened video sequence.

10. The computer-readable medium as claimed in claim 9, wherein the step of calculating false edge information data in said sharpened video sequence further comprises calculating a total number of false edges in said sharpened video sequence.

11. The computer-readable medium as claimed in claim 10, wherein said step of deriving said optimized sharpness metric comprises the sub-steps of:
   determining whether said total number of false edges exceeds a first threshold; and
   computing said sharpness quality score from said first and second spectral energy information and said total number of false edges.

12. The computer-readable medium as claimed in claim 10, wherein the step of calculating said total number of false edges in said sharpened video sequence, further comprises the sub-steps of:

creating a first edge map in said original video sequence;

creating a second edge map in said sharpened video sequence; and comparing said first and second edge maps to determine said total number of false edges in said sharpened video sequence.

13. The computer-readable medium as claimed in claim 9, wherein the step of calculating said second spectral energy information in said original sequence further comprises the steps of:

determining the frequency spectrum of said original video sequence; and computing a normalized Fourier transform of said original video sequence from said frequency spectrum.

14. The computer-readable medium as claimed in claim 9, wherein the step of calculating said first spectral energy information in said sharpened sequence further comprises the sub-steps of:

determining the frequency spectrum of said sharpened video sequence;

dividing the frequency spectrum into at least a first and a second sub-band;

computing a first normalized Fourier transform of said sharpened video sequence in said at least first sub-band;

computing a second normalized Fourier transform of said sharpened video sequence in said at least second sub-band; and using said first and second normalized Fourier transforms to derive said objective sharpness metric.

15. The computer-readable medium as claimed in claim 14, wherein the first and second normalized Fourier transforms are one of a horizontal and vertical transform.

* * * * *